United States Patent
Keller et al.

(10) Patent No.: US 9,056,672 B2
(45) Date of Patent: Jun. 16, 2015

(54) HYDRAULICALLY REGULATED ELECTROMAGNETIC ACTUATOR, AND LANDING GEAR FITTED WITH SUCH AN ACTUATOR FOR CONTROLLING SAME

(75) Inventors: Nicolas Keller, Alfortville (FR); Edouard Campbell, Savigny-sur-Orge (FR); Sébastien Dubois, Massy (FR); Albert De Pindray, Magny (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 58 days.

(21) Appl. No.: 13/640,809

(22) PCT Filed: Apr. 15, 2011

(86) PCT No.: PCT/EP2011/056042
§ 371 (c)(1),
(2), (4) Date: Dec. 21, 2012

(87) PCT Pub. No.: WO2011/128441
PCT Pub. Date: Oct. 20, 2011

(65) Prior Publication Data
US 2013/0092482 A1    Apr. 18, 2013

(30) Foreign Application Priority Data

Apr. 15, 2010    (FR) ...................................... 10 52885

(51) Int. Cl.
*B64C 25/26*    (2006.01)
*B64C 25/24*    (2006.01)
*F16D 57/06*    (2006.01)

(52) U.S. Cl.
CPC ................. *B64C 25/26* (2013.01); *B64C 25/24* (2013.01); *F16D 57/06* (2013.01)

(58) Field of Classification Search
CPC ........ B64C 25/26; B64C 25/24; B64C 25/10; F16D 57/06; F15B 15/22; B60G 220/22
USPC ................. 188/290, 292, 306, 307, 293, 294; 244/102 A, 102 R, 102 SL, 102 SS; 92/121; 91/399, 404, 405; 280/124.159
See application file for complete search history.

(56) References Cited

U.S. PATENT DOCUMENTS 2,429,425 A    10/1947    Nardone
3,470,792 A *  10/1969    Darling ........................... 91/396

(Continued)

FOREIGN PATENT DOCUMENTS

DE    198 49 756 A1    5/2000
DE    10 2005 061364 A1    7/2007

*Primary Examiner* — Thomas J Williams
*Assistant Examiner* — Mariano Sy
(74) *Attorney, Agent, or Firm* — Sughrue Mion, PLLC

(57) ABSTRACT

An electromechanical actuator comprising an electric motor (11) for driving an output shaft (4) in rotation via a reduction gear (20) and passive regulation stage (30) allowing for control of the speed of rotation of the output shaft. A braking member is arranged between an output of the reduction gear and the output shaft to be driven, the braking member being arranged to ensure two different braking levels depending on the direction of rotation of the shaft. The braking member is of hydraulic type and comprises a paddle (33) for transferring fluid between two chambers (34, 35) under the effect of the rotation of the output shaft, transferred fluid passing through a selective drawing member (41) which, depending on the direction of rotation of the actuator, opposes two distinct resistances to the decantation of the fluid from one chamber to the other.

7 Claims, 2 Drawing Sheets

(56) References Cited

U.S. PATENT DOCUMENTS

| | | | | |
|---|---|---|---|---|
| 3,631,761 A | * | 1/1972 | Rumsey | 91/408 |
| 3,670,627 A | * | 6/1972 | Valantin | 91/167 A |
| 3,771,422 A | * | 11/1973 | Kamman | 91/405 |
| 3,970,009 A | * | 7/1976 | Schultz | 105/164 |
| 3,979,998 A | * | 9/1976 | Wada | 91/26 |
| 4,759,186 A | * | 7/1988 | Sugden | 60/473 |
| 5,020,826 A | * | 6/1991 | Stecklein et al. | 280/124.159 |
| 5,033,265 A | * | 7/1991 | Sugden | 60/444 |
| 5,086,995 A | * | 2/1992 | Large | 244/102 R |
| 5,100,083 A | * | 3/1992 | Large et al. | 244/102 SS |
| 6,484,675 B2 | * | 11/2002 | Pierik | 123/90.15 |
| 7,731,124 B2 | * | 6/2010 | Griffin | 244/102 R |
| 8,523,107 B2 | * | 9/2013 | Salmon et al. | 244/102 A |

\* cited by examiner

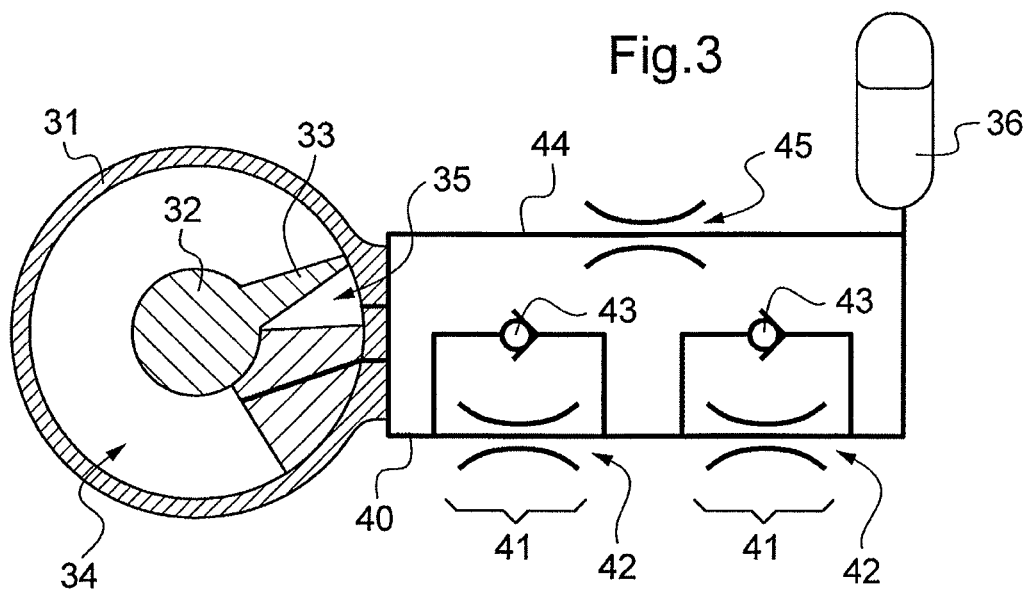
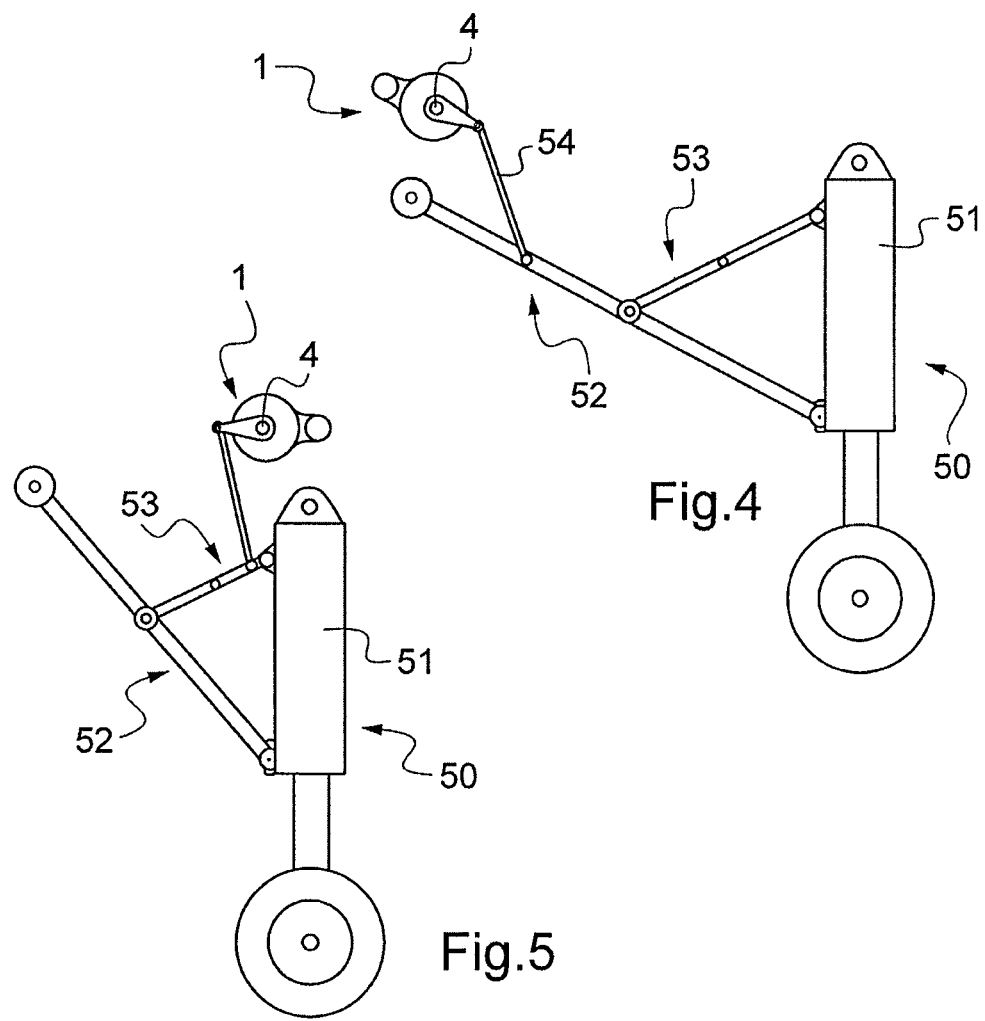

HYDRAULICALLY REGULATED ELECTROMAGNETIC ACTUATOR, AND LANDING GEAR FITTED WITH SUCH AN ACTUATOR FOR CONTROLLING SAME

CROSS REFERENCE TO RELATED APPLICATIONS

This application is a National Stage of International Application No. PCT/EP2011/056042 filed Apr. 15, 2011, claiming priority based on French Patent Application No. 10 52885 filed Apr. 15, 2010, the contents of all of which are incorporated herein by reference in their entirety.

The present invention relates to an electromechanical actuator with hydraulic regulation, as well as a landing gear equipped with such an actuator for maneuvering same.

Although particularly designed for an application in the aeronautical field, the actuator of the invention will also be able to be used in other applications, notably in those in which the rotation of the output shaft must also be controlled in cases of absence of power supply or of malfunctioning of the electric motor.

BACKGROUND OF THE INVENTION

Aircraft landing gear are known for which the maneuvering between a deployed position and a retracted position is performed by means of an actuator of hydraulic type, for example a cylinder. Very often, the landing gear is left to lower under the effect of gravity, the cylinder being used as a regulator to limit the speed of lowering of the landing gear. To this end, the fluid expelled from the chamber of the cylinder is made to be drawn so that its volume is reduced in the lowering. This braking is automatic and therefore occurs even if the hydraulic generation were to fail, which represents a high level of safety.

Use is also made, notably on light aircraft, of rotary electromechanical actuators which cooperate with the landing gear either directly at the level of a pivot of the landing gear, or indirectly via a link rod coupled between a crank attached to the actuator and the caisson of the landing gear. Once again, the lowering of the landing gear takes place under the effect of gravity, and the electromechanical actuator is used as lowering regulator. To this end, the electric motor of the actuator is powered so that it exerts a resisting torque, thus regulating the speed of lowering of the landing gear.

However, in the event of an absence of power supply or of malfunctioning of the electric motor, there is no element of the motor that allows for braking and therefore controlling of the lowering of the landing gear, which can prove problematical since, in cases of uncontrolled lowering of the landing gear, there is a significant risk of damage to the latter when it reaches its end of travel.

To limit this risk, it is possible to envisage equipping the actuator with a number of electric motors so as to reduce the risk of failure of a motor of the actuator, but, doubling or tripling the number of motors needed to control the actuator would result in a considerable increase in the weight and the volume of the actuator. Moreover, the problem would still remain in the event of a general electrical failure.

OBJECT OF THE INVENTION

The object of the present invention is to present an electromechanical actuator that allows for a passive regulation of the speed when the actuator is driven by an external cause.

SUMMARY OF THE INVENTION

To this end, the invention relates to an electromechanical actuator comprising an electric motor for driving a shaft in rotation via a reduction gear and regulation means allowing for control of the speed of rotation of the shaft. According to the invention, the regulation means are passive and comprise a braking member, arranged between an output of the reduction gear and the shaft to be driven, said braking member being arranged to ensure two different braking levels depending on the direction of rotation of the shaft.

Thus, if the electric motor fails to operate, the driving device continues to brake the shaft so that the speed of rotation of the shaft is still controlled.

Furthermore, the braking means oppose a resistance to the displacement of the shaft which differs according to its direction of rotation. This characteristic is particularly interesting in the case of an application to a landing gear actuator for which the resistance allowing for control of the lowering will be able to be chosen as relatively high whereas the resistance to be opposed during the raising of the landing gear can be chosen to be limited, even zero, to reduce the quantity of energy needed for the raising.

According to a preferred embodiment of the invention, the braking member is of hydraulic type and comprises means for transferring fluid from one chamber to another under the effect of the rotation of the output shaft through a selective drawing member which, depending on the direction of rotation of the actuator, opposes two distinct resistances to the decantation of the fluid from one chamber to the other.

BRIEF DESCRIPTION OF THE DRAWINGS

The present invention will be better understood on reading about a detailed exemplary embodiment with reference to the appended drawings, provided by way of nonlimiting example, in which:

FIG. 3 represents an exemplary embodiment of the hydraulic circuit of the actuator of FIGS. 1 and 2;

FIGS. 4 and 5 schematically represent two landing gears equipped with an actuator according to the invention to ensure their maneuvering.

DETAILED DESCRIPTION OF THE INVENTION

Figure 1:
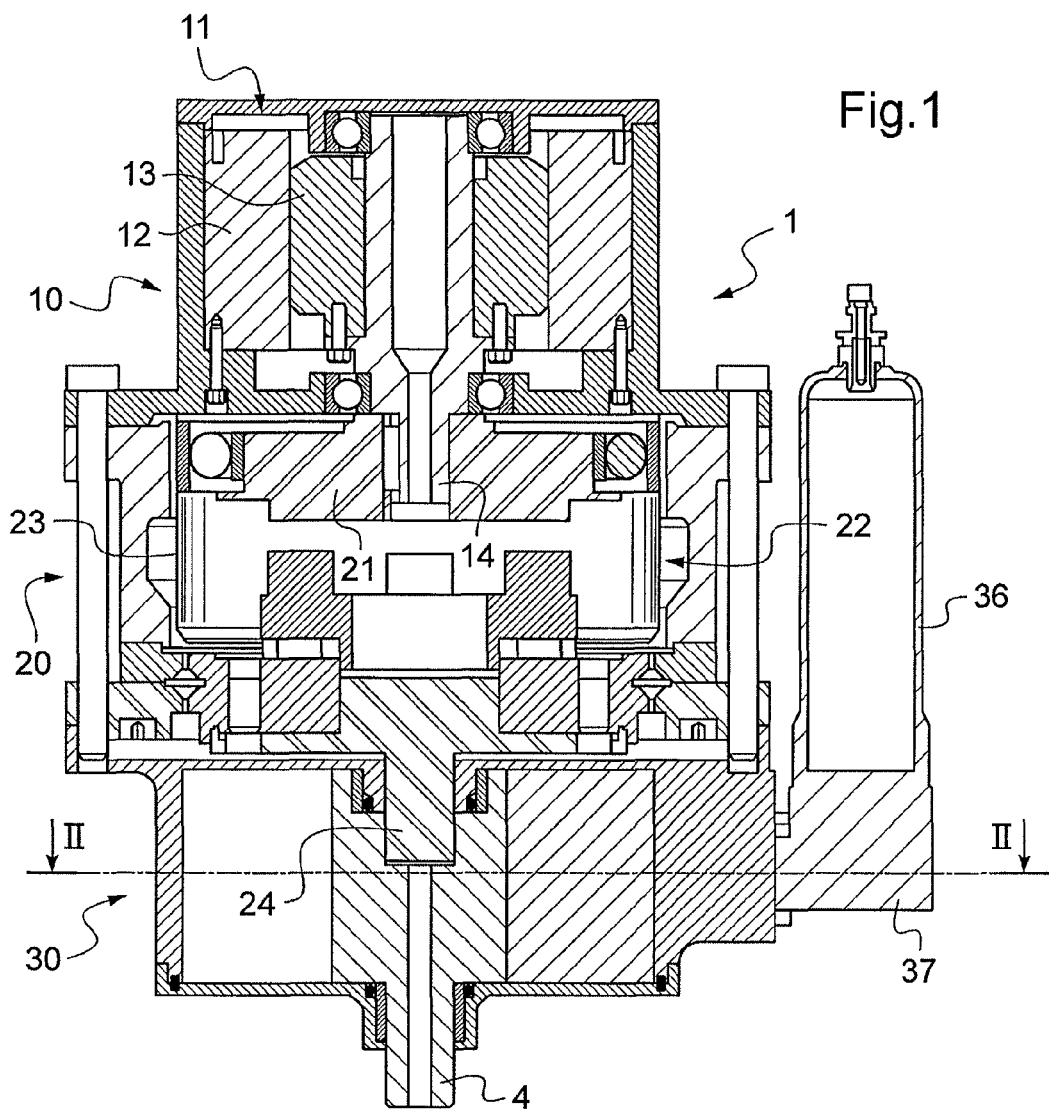
FIG. 1 represents a longitudinal cross-sectional view of an actuator according to the invention.

Referring to FIG. 1, the actuator 1 of the invention comprises a driving stage 10, a reduction stage 20, as well as a regulation stage 30. The driving stage 10 comprises an electric motor 11, the stator 12 and the rotor 13 of which can be seen, which comprises an output shaft 14 penetrating into the reduction stage 20 to cooperate with the input member 21 of a reduction gear, here a reduction gear of "harmonic drive" type 22 with deformable bell 23. This reduction gear is well known for offering a significant reduction ratio. The output shaft 24 associated with the deformable bell 23 penetrates into the regulation stage 30 to cooperate with a braking member which comprises an output shaft 4 which constitutes the output shaft of the actuator 1.

Figure 2:
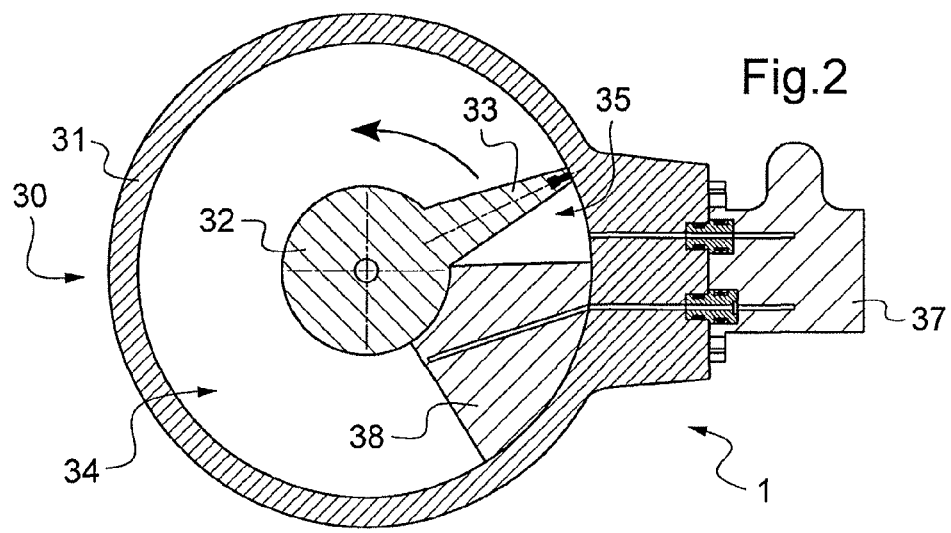
FIG. 2 is a cross section along the line II-II of FIG. 1, at the level of the regulation stage of the actuator represented in FIG. 1.

As can be seen in FIG. 2, the braking member comprises a casing 31 of circular section in which a rotor 32 provided with a paddle 33 rotates by being driven by the output shaft 24 of the reduction gear 22. A fixed segment 38 extends in the casing 31 to define, with the rotor 32 and the paddle 33, two chambers 34 and 35 for which the volume varies with the rotation of the rotor 32 and of the paddle 33 so that, when the volume of one of the chambers increases, the volume of the other chamber decreases. The two chambers 34, 35 are fluidically connected with an accumulator 36 (visible in FIG. 1) via a hydraulic block 37 comprising a certain number of hydraulic components which are now detailed in relation to FIG. 3 in which the fluidic connections are represented by thick lines.

The chamber 34 is connected by a first fluidic branch 40 to the accumulator 36. The first fluidic branch 40 comprises two hydraulic components 41 placed in series and each comprising a restrictor 42 associated with a non-return valve 43 forcing the fluid to pass through the restrictors 42 when the fluid passes from the chamber 34 to the accumulator 36. The chamber 35 is in turn connected by a second fluidic branch 44 to the accumulator 36. The second fluidic branch 44 comprises a regulating restrictor 45.

The operation of the braking member is as follows. When, under the action of the electric motor 11 or an external cause, the paddle 33 rotates in the direction indicated by the arrow in FIG. 2, which is that for which the chamber 34 sees its volume decrease, fluid is expelled from the chamber 34 to the accumulator 36 via the first fluidic branch 40 by passing through the restrictors 42 which exert a strong resistance to the passage of the fluid, and therefore helps to brake the rotation of the paddle 33, and, consequently, the rotation of the output shaft 4 of the actuator. In parallel, fluid passes from the accumulator 36 to the chamber 35 by passing through the restrictor 45 of the second fluidic branch 44. However, this restrictor 45 is sufficiently open and the pressure of the accumulator 36 is sufficiently high for no cavitation to be observed in the chamber 35.

When the paddle rotates in the other direction, it is the chamber 35 which sees its volume decrease, and fluid is expelled to the accumulator 36 via the restrictor 45 of the second fluidic branch 44, which opposes a light resistance, thus allowing for a regulation of the speed of rotation of the output shaft 4. In parallel, fluid is expelled from the accumulator 36 to the chamber 34 by passing through the non-return valves 43 of the second fluidic branch, which are passing in this direction, so that the restrictors 42 are shunted.

Thus, the transfer from one chamber to the other (here via the accumulator) is done forcing the fluid to pass through drawing members which selectively draw (strong drawing in one direction, weak or almost zero drawing in the other direction), so that the braking member offers two distinct braking levels, depending on the direction of rotation of the output shaft 4 of the actuator. This braking is purely passive, and takes place in particular when the output shaft 4 is driven by an external cause.

Such an actuator can advantageously be used for the maneuvering of a landing gear between its deployed position and its retracted position. It can be arranged on an articulation axis of the caisson to directly drive the latter, or even be arranged parallel to the articulation axis of the caisson of the landing gear to drive the latter via a toothed segment, or even be coupled to the caisson of the landing gear by a link rod linked to a crank driven by the actuator. Clearly, it will be ensured that the direction of rotation for which a greater braking is generated corresponds to the one that the landing gear imposes on the actuator when the landing gear lowers to the deployed position under the effect of gravity or of relative wind. This purely passive braking makes it possible to regulate the dropping speed of the actuator, so that even a failure of the electrical power supply or a rupturing of the transmission member, preventing the electric motor from exerting a resisting torque, will not compromise the braking that is thus performed. As a variant, and as is illustrated in FIGS. 4 and 5, the actuator of the invention can be coupled to one of the elements of the bracing, provided that the element concerned has a monotonic displacement with no switchback when the landing gear switches from the deployed position to the retracted position. These figures show a landing gear 50 for which the caisson 51 is articulated on the structure of an aircraft. A folding brace 52 comprising two mutually articulated arms is articulated on the one hand on the structure of the aircraft and on the other hand on the caisson. A locking member 53, here also comprising two articulated arms, extends between the brace 52 and the structure of the aircraft, as illustrated in FIG. 4, or the caisson of the landing gear, as illustrated in FIG. 5. In FIG. 4, the actuator 1 of the invention is coupled to one of the arms of the brace 52 by means of a link rod 54 which cooperates with a crank 55 driven by the output shaft 4 of the actuator 1.

To raise the landing gear to its retracted position, it will be sufficient to power the electric motor 11 of the actuator for the latter to exert a torque resulting in the raising of the landing gear. It will be noted that, in the arrangement of FIG. 4, an unlocking actuator (not represented) should be provided to act on the locking member 53 and unlock the brace 52. On the other hand, in the arrangement of FIG. 5, the same actuator unlocks the brace and drives the landing gear to its retracted position.

The invention is obviously not limited to what has just been described, but, on the contrary, encompasses any variant falling within the framework defined by the claims. In particular, although the braking member of the regulation stage described here is of the paddle type, it will be possible to use any other braking member, provided that this member exerts distinct braking levels depending on the direction of rotation of the actuator, one of the braking levels being able if appropriate to be zero or negligible compared to the other braking level.

The invention claimed is:

1. An electromechanical actuator comprising:
   an electric motor (11) for driving an output shaft (4) in rotation via a reduction gear (20),
   passive regulation means (30) allowing for control of the speed of rotation of the output shaft, and
   a braking member, arranged between an output of the reduction gear and the output shaft to be driven, said braking member being arranged to ensure two different braking levels depending on the direction of rotation of the shaft,
   wherein the braking member is of hydraulic type and comprises means (33) for transferring fluid between a first chamber (34) and a second chamber (35), under the effect of the rotation of the output shaft through:
      a first selective drawing member (41) which, depending on the direction of rotation of the actuator, opposes two distinct resistances to the transfer of the fluid from one chamber to the other chamber, and through;
      a second selective drawing member which, depending on the direction of rotation of the actuator, opposes two distinct resistances to the transfer of the fluid from one chamber to the other chamber,
   said first and second selective drawing members being disposed in series and each one of said first and second selective drawing members comprising a restrictor (42) in parallel with a non-return valve (43) forcing the fluid to pass through the restrictor (42) when the fluid is transferred from the first chamber (34) to the second chamber (35), but shunting the restrictor (42) when the fluid is transferred from the second chamber (35) to the first chamber (34).

2. The actuator according to claim 1, in which the braking member comprises a cylindrical casing (31) in which a fixed segment (38) and a rotating paddle (33) extend to define the two chambers (34, 35) and provoke the transfer of fluid from one chamber to the other chamber during rotation of said rotating paddle (33).

3. The actuator according to claim 1, in which the fluid is transferred from one chamber to the other chamber by passing through an accumulator (36).

4. The actuator according to claim 1, in which the fluid is transferred from one chamber to the other chamber by passing through an accumulator (36), and in which the first chamber communicates with the accumulator (36) via a fluidic branch comprising said first and second selective drawing members;

said restrictor (42) and said non-return valve (43) of the first drawing member being disposed so as to force the fluid to pass through the restrictor of the first drawing member when the fluid passes from the first chamber (34) to the accumulator (36), and so as to shunt the restrictor (42) when the fluid passes from the accumulator (36) to the first chamber (34); and said restrictor and said non-return valve (43) of the second drawing member being disposed so as to force the fluid to pass through the restrictor of the second drawing member when the fluid passes from the first chamber (34) to the accumulator (36), and so as to shunt the restrictor (42) of the second drawing member when the fluid passes from the accumulator (36) to the first chamber (34).

5. Aircraft landing gear comprising:
a caisson (51) articulated on a structure of aircraft, the aircraft landing gear being movable between a retracted position and a deployed position by pivoting the caisson (51) relative to the structure of the aircraft;
an actuator for maneuvering between the retracted position and the deployed position, the actuator comprising an electric motor (11) for driving an output shaft (4) in rotation via a reduction gear (20) and passive regulation means (30) allowing for control of the speed of rotation of the output shaft, and comprising a braking member, arranged between an output of the reduction gear and the output shaft to be driven, said braking member being arranged to ensure two different braking levels depending on the direction of rotation of the shaft, wherein the braking member is of hydraulic type and comprises means (33) for transferring fluid between a first chamber (34) and a second chamber (35), under the effect of the rotation of the output shaft through a first selective drawing member (41) which, depending on the direction of rotation of the actuator, opposes two distinct resistances to the transfer of the fluid from one chamber to the other chamber, said first selective drawing member (41) comprising a restrictor (42) in parallel with a non-return valve (43) forcing the fluid to pass through the restrictor (42) when the fluid is transferred from the first chamber (34) to the second chamber (35), but shunting the restrictor (42) when the fluid is transferred from the second chamber (35) to the first chamber (34),
wherein the actuator is arranged so that, when its output shaft is driven by the lowering of the landing gear to the deployed position, the braking member exerts the greatest braking level.

6. The landing gear according to claim 5, in which the output shaft of the actuator is coupled to a bracing element (52; 53) of the landing gear, said bracing element being articulated on the one hand on the structure of the aircraft and on the other hand on the caisson.

7. Aircraft landing gear comprising:
a caisson (51) articulated on a structure of aircraft, the aircraft landing gear being movable between a retracted position and a deployed position by pivoting the caisson (51) relative to the structure of the aircraft;
an actuator for maneuvering between the retracted position and the deployed position, the actuator comprising an electric motor (11) for driving an output shaft (4) in rotation via a reduction gear (20) and passive regulation means (30) allowing for control of the speed of rotation of the output shaft, and comprising a braking member, arranged between an output of the reduction gear and the output shaft to be driven, said braking member being arranged to ensure two different braking levels depending on the direction of rotation of the shaft, wherein the braking member is of hydraulic type and comprises means (33) for transferring fluid between a first chamber (34) and a second chamber (35), under the effect of the rotation of the output shaft through a first selective drawing member (41) and a second selective drawing member, said drawing members which, depending on the direction of rotation of the actuator, opposes two distinct resistances to the transfer of the fluid from one chamber to the other chamber;
said first selective drawing member (41) comprising a restrictor (42) of the first selective drawing member in parallel with a non-return valve (43) of the first selective drawing member forcing the fluid to pass through the restrictor (42) of the first selective drawing member when the fluid is transferred from the first chamber (34) to the second chamber (35), but shunting the restrictor (42) of the first selective drawing member when the fluid is transferred from the second chamber (35) to the first chamber (34); and
said second selective drawing member comprising a restrictor of the second selective drawing member in parallel with a non-return valve (43) of the second selective drawing member forcing the fluid to pass through the restrictor (42) of the second selective drawing member when the fluid is transferred from the first chamber (34) to the second chamber (35), but shunting the restrictor (42) of the second selective drawing member when the fluid is transferred from the second chamber (35) to the first chamber (34); and
wherein the actuator is arranged so that, when its output shaft is driven by the lowering of the landing gear to the deployed position, the braking member exerts the greatest braking level.

* * * * *